(12) United States Patent
Zhu et al.

(10) Patent No.: US 6,796,719 B2
(45) Date of Patent: Sep. 28, 2004

(54) OPTICAL FIBER CONNECTOR

(75) Inventors: ZiQiang Zhu, Kunsan (CN); Jian Ning Yang, Kunsan (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 246 days.

(21) Appl. No.: 10/017,120

(22) Filed: Dec. 14, 2001

(65) Prior Publication Data

US 2003/0113070 A1 Jun. 19, 2003

(51) Int. Cl.⁷ .................................................. G02B 6/36
(52) U.S. Cl. .............................. 385/76; 385/78; 385/88; 385/92
(58) Field of Search ........................ 385/76–84, 88–94, 385/53–58

(56) References Cited

U.S. PATENT DOCUMENTS

| | | | | |
|---|---|---|---|---|
| 6,004,043 A | * | 12/1999 | Abendschein et al. | ......... 385/76 |
| 6,081,647 A | * | 6/2000 | Roth et al. | .................. 385/139 |
| 6,240,229 B1 | * | 5/2001 | Roth | ........................... 385/53 |
| 6,352,375 B1 | * | 3/2002 | Shimoji et al. | ............... 385/92 |

* cited by examiner

*Primary Examiner*—Hemang Sanghavi
(74) *Attorney, Agent, or Firm*—Wei Te Chung

(57) ABSTRACT

An optical fiber connector (3) includes an insert body (31), a door (33), a housing (35), an optical element (37) and a spacer (39). The door includes a shutter (331), a fixing portion (335) and a spring member (333) assembled onto the shutter. The door is held between the insert body and the housing. The shutter can bend inwardly into an inserting hole (351) defined by the housing when a fiber plug (5) is inserted the inserting hole.

17 Claims, 10 Drawing Sheets

US 6,796,719 B2

OPTICAL FIBER CONNECTOR

BACKGROUND OF THE INVENTION

1. Field of the Invention

The present invention relates to an optical fiber connector, and particularly to an optical fiber connector having an spring member for applying a spring force to press and stably mount a fiber plug inserted into the optical fiber connector.

2. Description of Related Art

Present day telecommunication technology utilizes, to an increasing extent, optical fibers for signal transmission. The use of optical fibers, in turn, requires numerous collateral components especially adapted to handle the light or optical transmission, among which are optical fiber connectors.

Optical fiber connectors for connecting between digital audio systems mostly use a ferrule for alignment and support of the fiber, whether it is made from glass or plastic. And the ferrule is inserted into an inserting hole of a housing of the optical fiber connector. Examples of optical fiber connector that uses a plastic fiber within a ferrule include: i) the F07 Duplex Plastic Fiber System from AMP; ii) the SMI (small Multi-media Interface) Connector from Sony Corporation; and iii) the HFBR series of plastic fiber connectors from Hewlett Packard. For assuring performance of the optical connector, it is necessary that a door prevents dust and vapor in the air from entering the inserting hole of the housing.

For example, as shown in FIG. 9, Japanese Patent Publication No. 6-331859 discloses an optical fiber connector, which comprises a housing 1 holding an optical element 11, a rotatable door 13 assembled to the housing 1, a fiber plug 2 and a fiber 21 received in the fiber plug 2. The housing 1 defines a cavity 12 for receiving the fiber plug 2. However, the rotatable door 13 is not received in the housing 1, and is easy to be damaged. Furthermore, the rotatable door 13 is at outside of the housing 1 when the fiber plug 2 is inserted into the cavity 12, which increases the space occupied by the optical fiber connector.

It is thus desirable to provide an improved optical connector for overcoming the above problems.

SUMMARY OF THE INVENTION

Another object of the present invention is to provide an improved optical fiber connector having a door received in a housing of the optical fiber connector when a fiber plug is inserted in the housing.

Another object of the present invention is to provide an optical fiber connector having a spring member for applying a spring force to a fiber plug mated with the optical fiber connector.

An optical fiber connector comprises an insert body, a door, a housing, an optical element and a spacer.

The door comprises a shutter, a fixing portion and a spring member. An indentation is defined in the middle of the fixing portion. The shutter can be made from elastoplastic polymer material. The shutter can undergo deformation when an external force is applied thereto, and can restore to its original state when the external force is removed.

The insert body is inserted into an inserting hole of the housing and mounted therein, and coven the inlet side of the inserting hole. A opening of the insert body communicates with the inserting hole of the housing. A faceplate of the insert body communicates with the inserting hole of the housing. A faceplate of the insert body and a flange of the housing hold the fixing portion of the door therebetween, thus mounting the elastic body. An protuberance of the faceplate engages with the indentation of the door, helping stably mount the door. The door attached to the inlet side of the inserting bole closes the opening of the insert body to prevent dust and vapor from entering the inserting hole. The spacer is inserted into the housing and engages with the housing by coupling keys of the spacer with notches of the housing. The optical element is mounted in a mounting aperture of the housing by engaging the spacer to the housing.

The shutter of the door is bent inwardly in the inserting hole of the housing by insertion of the fiber plug, until the fiber plug is completely inserted into the inserting hole of the housing.

Other objects, advantages, and novel features of the present invention will become more apparent from the following detailed description when taken in conjunction with the accompanying drawings.

DETAILED DESCRIPTION OF THE INVENTION

Figure 1:
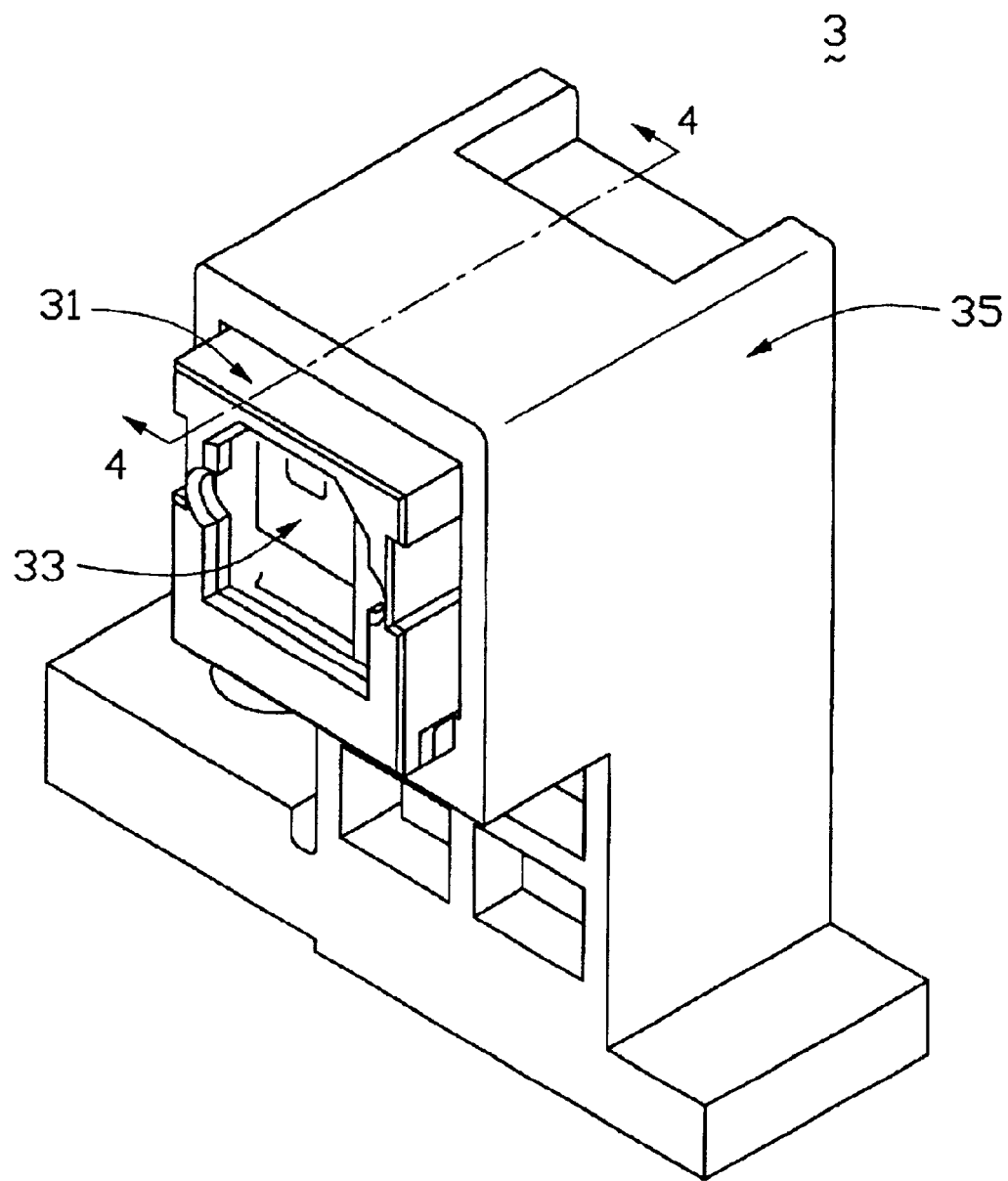
FIG. 1 is an assembled view of an optical fiber connector according to the present invention.
Figure 2:
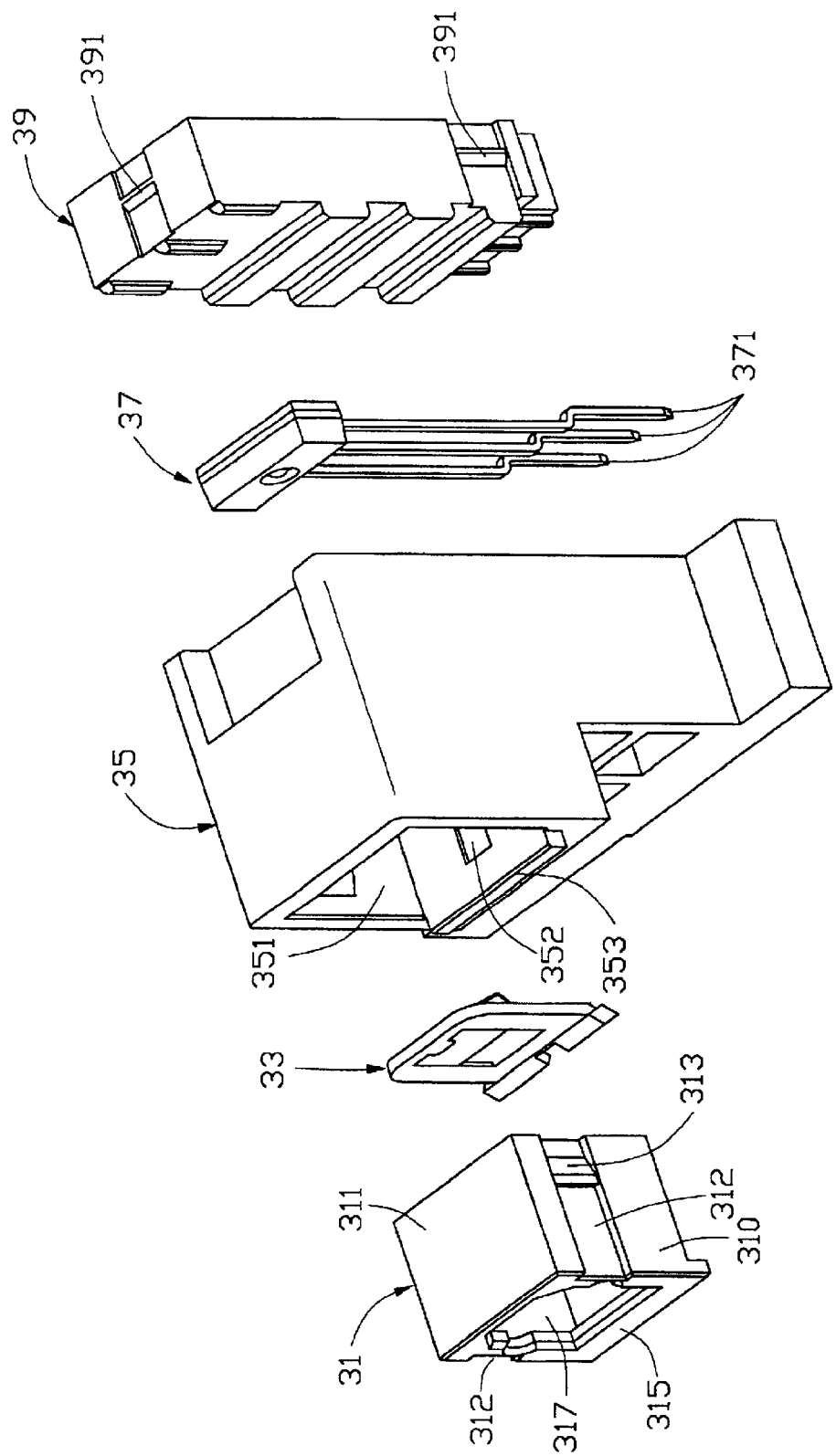
FIG. 2 is a perspective, exploded view of FIG. 1.

As shown in FIGS. 1 and 2, an optical fiber connector 3 comprises an insert body 31, and a door 33, a housing 35.

The insert body 31 has an open bottom and comprises a top wall 311, two opposite sidewalls 310, and a faceplate 315. An opening 317 is defined in the middle of the faceplate 315 and communicates with a space (not labelled) defined by the two sidewalls 310 and the top wall 311. A pair of grooves 312 are separately defined in the two sidewalls 310 of the insert body 31. A pair of keys 313 respectively protrude from the grooves 312 of the insert body 31.

Figure 3:
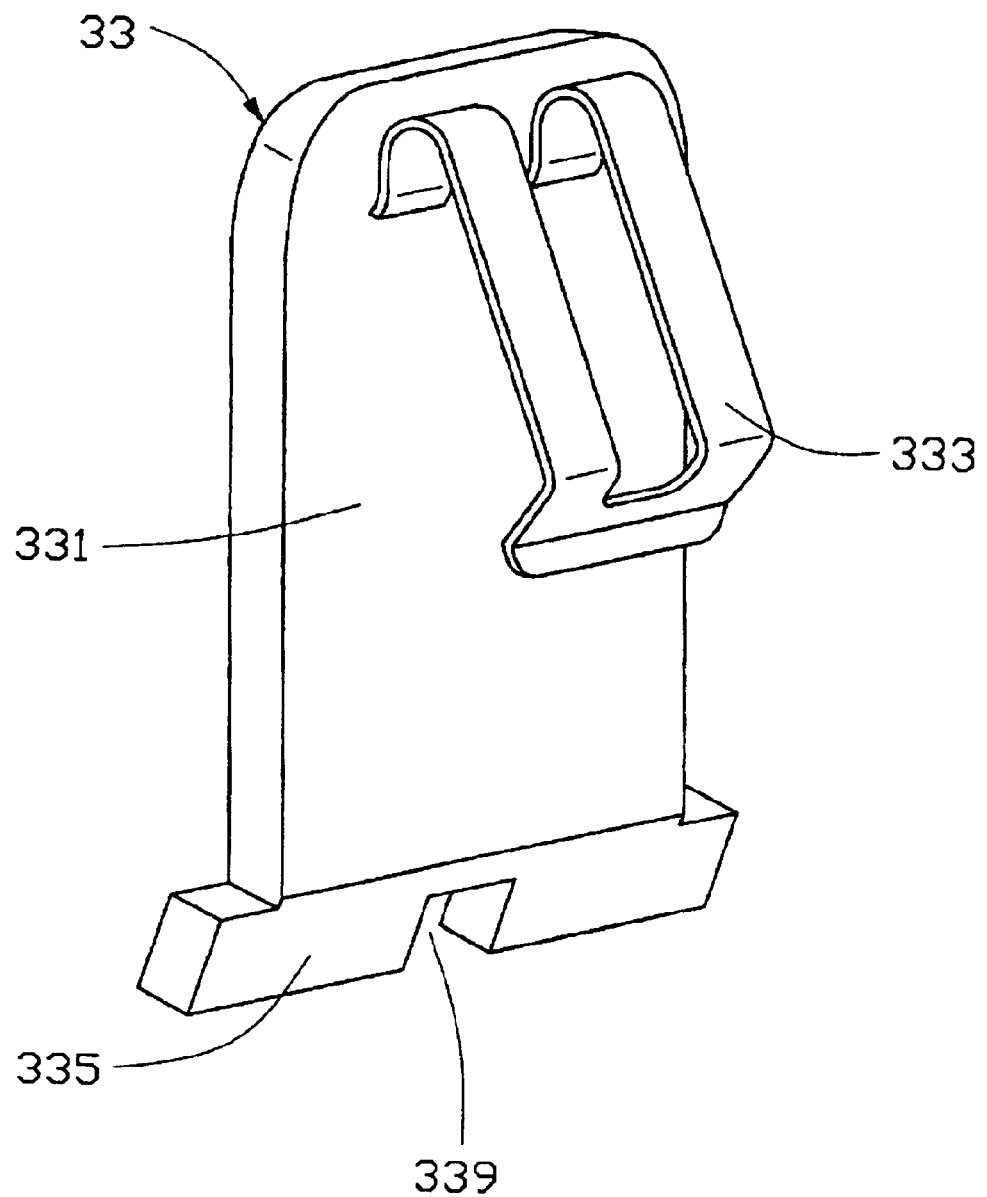
FIG. 3 is a perspective view of a door of the optical fiber connector.

Referring to FIG. 3, the door 33 comprises a shutter 331, a fixing portion 335 and a spring member 333. The spring member 333 is insert molded with the shutter 331. An indentation 339 is defined in the middle of the fixing portion 339. The shutter 331 can be made from an elastoplastic polymer material. The shutter 331 can undergo deformation when an external force is applied thereto, and can restore to its original state when the external force is removed.

Figure 4:
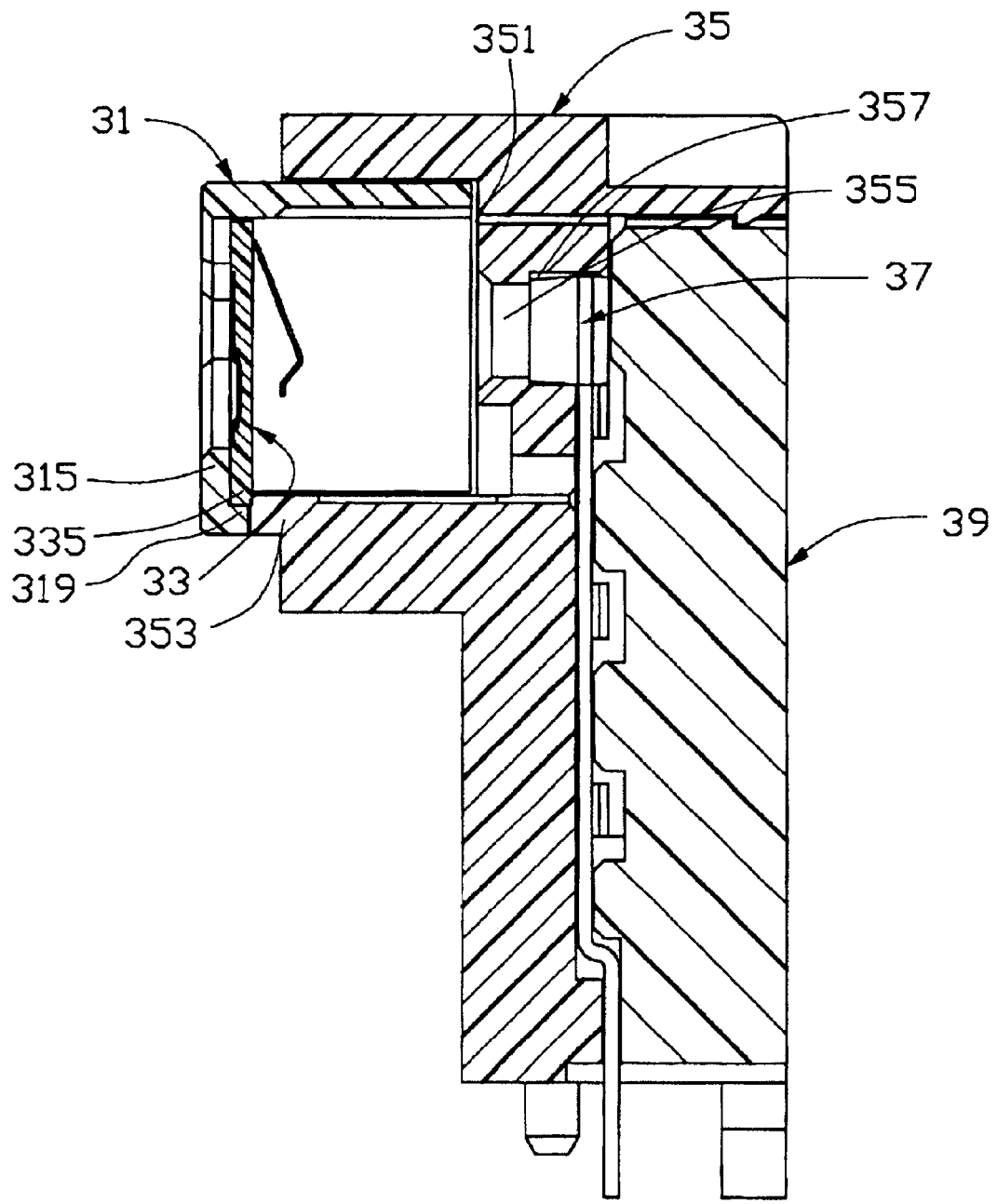
FIG. 4 is a cross-sectional view taken along line 4—4 in FIG. 1.

Referring to FIG. 4, the housing 35 defines an inserting hole 351 for retaining the insert body 31, and a recess 352 for receiving the spring member 333. The housing 35 includes a front flange 353 for cooperating with the faceplate 315 to clamp the fixing portion 335. An inserting aperture 355 and a mounting aperture 357 are defined in the housing 35 and communicate with the inserting hole 351.

The optical connector 3 further comprises an optical element 37 and a spacer 39. The optical element 37 comprises a plurality of terminals 371. The optical element 37 connects with a printed circuit board (not shown) through the terminals 371 for emitting or receiving light signals. The optical element 37 is mounted in the mounting aperture 355 by engaging the spacer 39 to the housing 35.

In assembly, as shown in FIG 4, the insert body 31 is inserted into the inserting hole 351 of the housing 35 and is mounted therein by coupling the keys 313 of the insert body 31 with notches (not shown) of the housing 35. The faceplate 315 of the insert body 31 covers the inlet side of the inserting hole 351. The opening 317 of the insert body 31 and the inserting hole 351 of the housing communicate with each other. The faceplate 315 and the front flange 353 hold the fixing portion 335 of the door 33 therebetween, thus mounting the door 33 in position. A protuberance 319 of the faceplate 315 engages in the indentation 339 of the door 33, helping to stably mount the door 33. The door 33 attached to the inlet side of the inserting hole 351 closes the opening 317 of the insert body 31 to prevent dust and vapor from entering the inserting hole 351. The spacer 39 is inserted into the housing 35 and engages with the housing 35 by the keys 391 of the spacer 39 coupling with keys (not labeled) of the housing 35. The optical element 37 is mounted in the mounting aperture 355 by engaging the spacer 39 with the housing 35.

Figure 5:
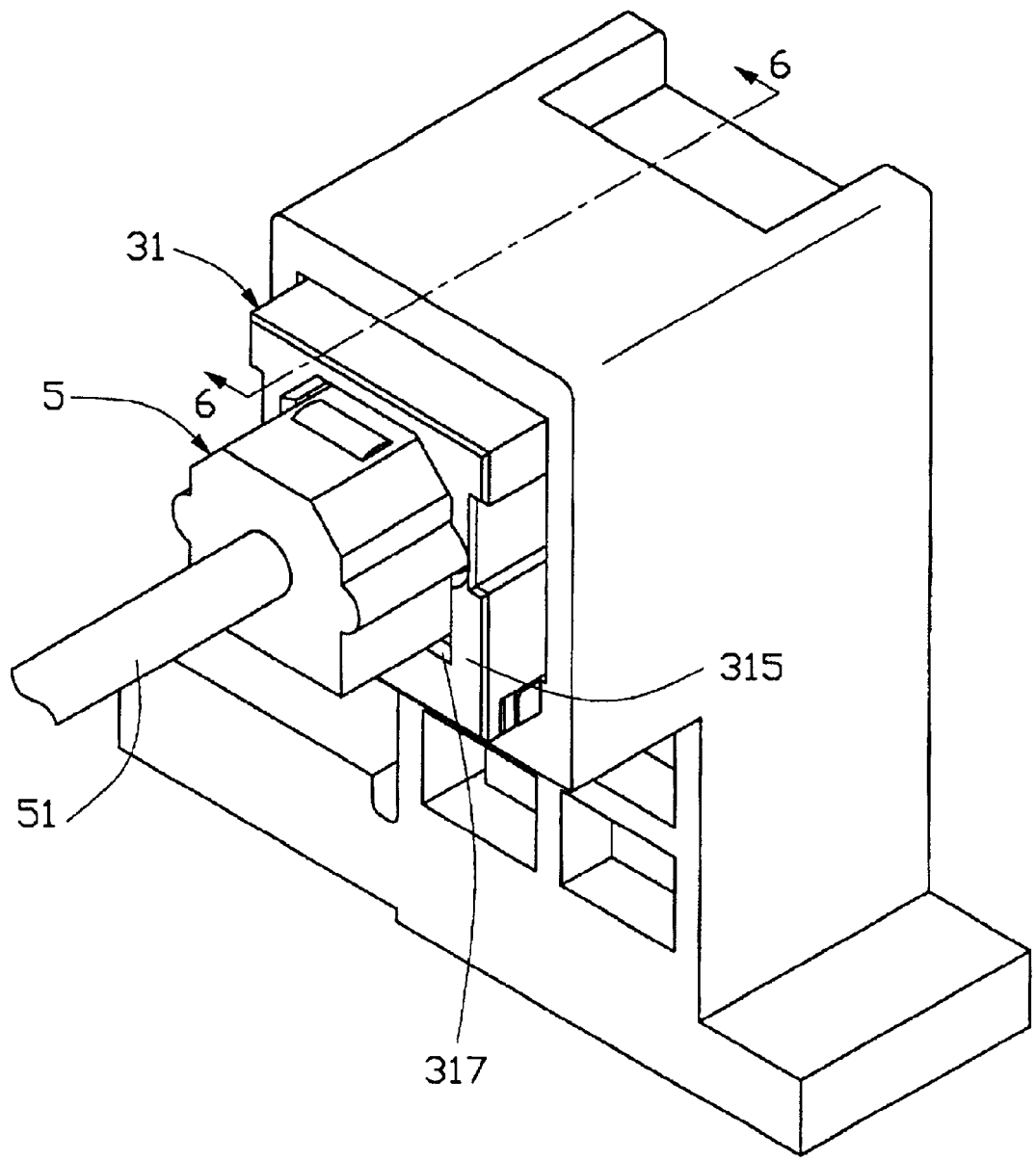
FIG. 5 is a perspective view of the optical fiber connector, with a fiber plug partly inserted therein.
Figure 6:
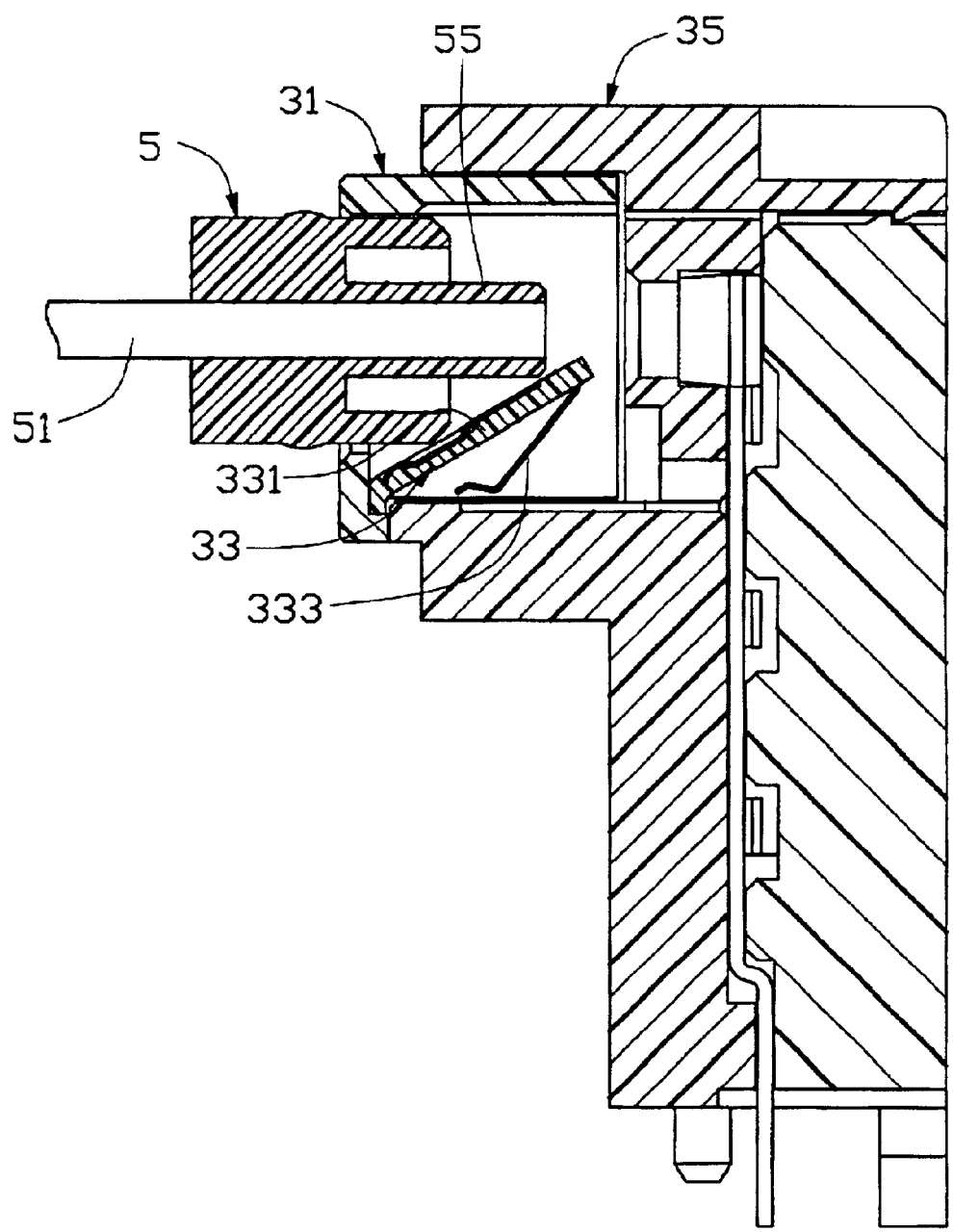
FIG. 6 is a cross-sectional view taken along line 6—6 in FIG. 5.

As shown in FIGS. 5 and 6, the fiber plug 5 comprises a fiber 51 made of glass or plastic and a ferrule 55. The shutter 331 of the door 33 is bent inwardly in the housing 35 by insertion of the fiber plug 5, until the fiber plug 5 is completely inserted into the housing 35.

Figure 7:
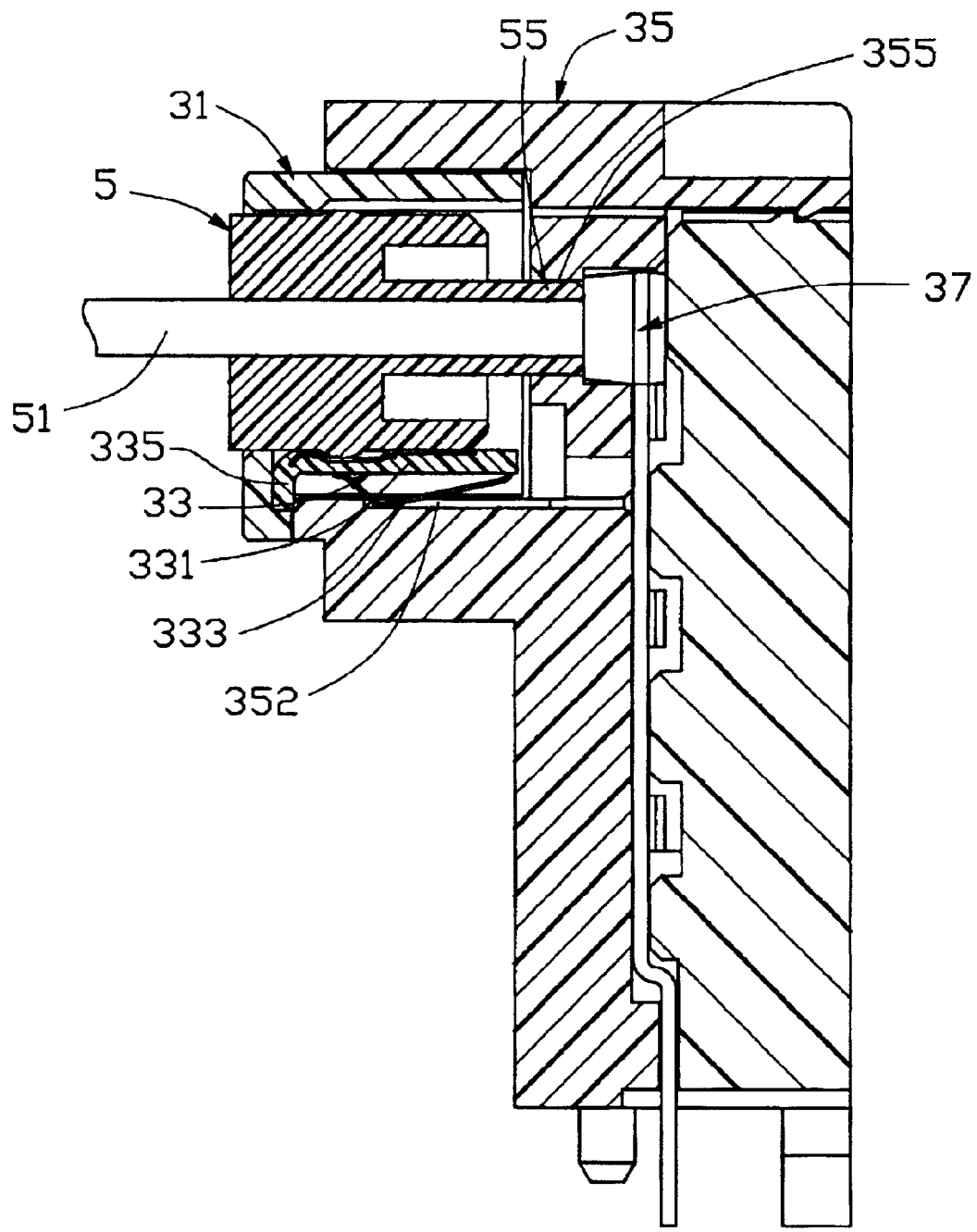
FIG. 7 is a cross-sectional view of the optical fiber connector, with the fiber plug completely inserted therein.

Referring to FIG. 7, the fiber plug 5 is received in the insert body 31 and the housing 35. An end of the ferrule 55 is received in the inserting aperture 355 of the housing 35. The shutter 331 of the door 33 is bent substantially perpendicularly to the fixing portion 335. The spring member 333 is received in the recess 352 of the housing and applies to provide a force to press the shutter 331 to contact the fiber plug 5 tightly. The fiber plug 5 is thus stably mounted in the housing 35 because of pressing force from the shutter 331 of the door 33.

Figure 8:
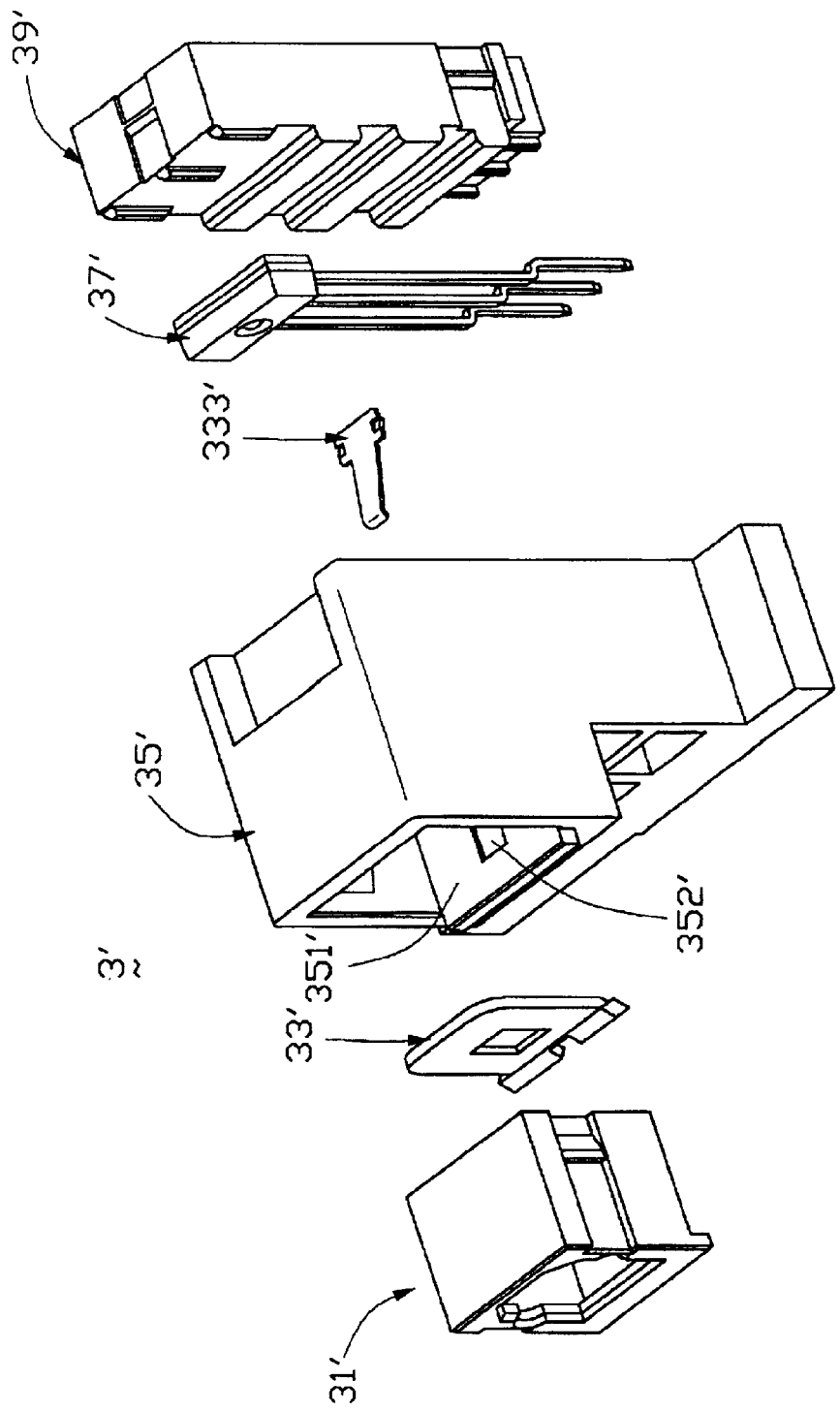
FIG. 8 is a perspective, exploded view of an optical fiber connector of a second embodiment.
Figure 9:
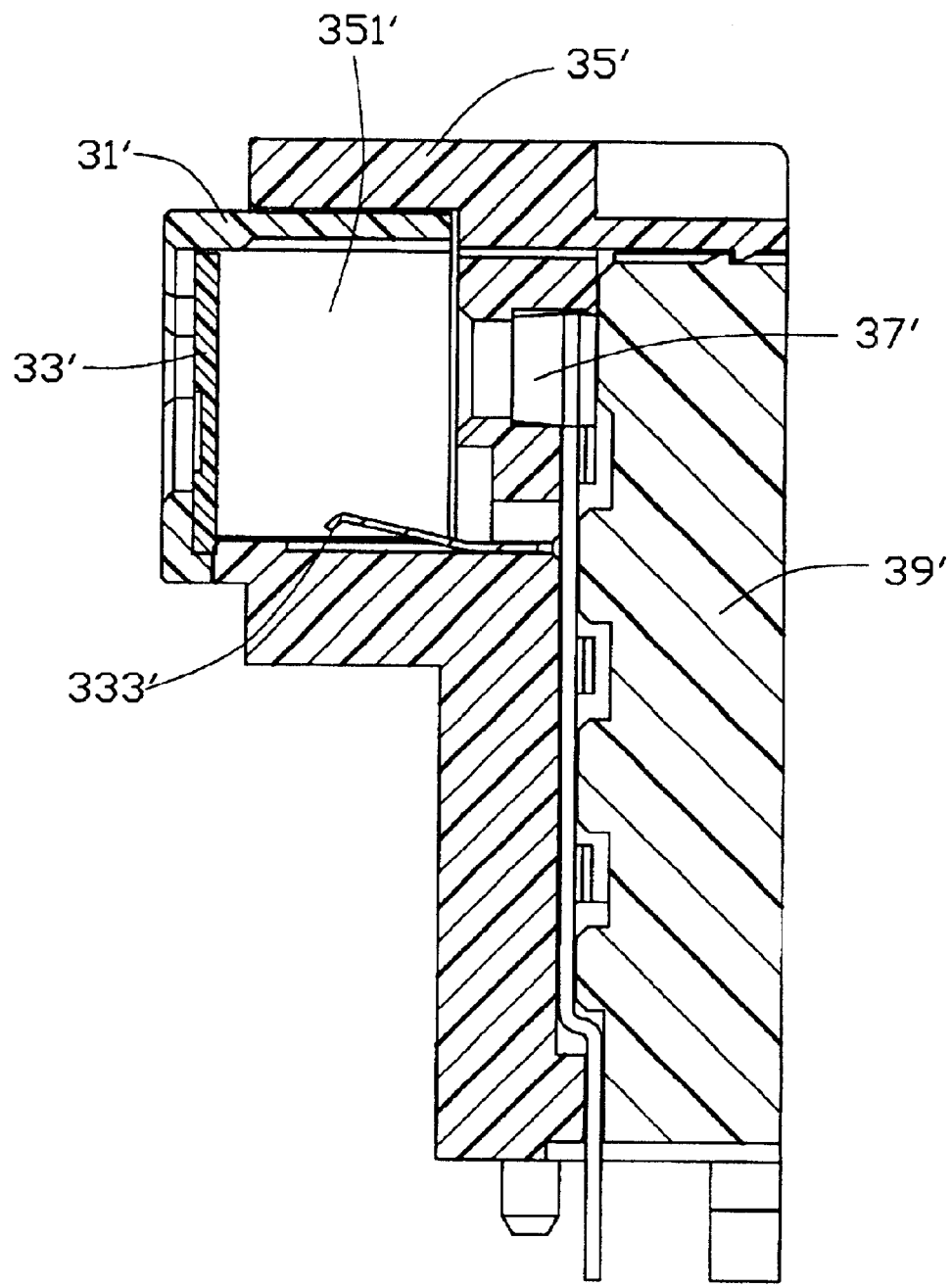
FIG. 9 is a cross-sectional view of the optical fiber connector of the second embodiment.
Figure 10:
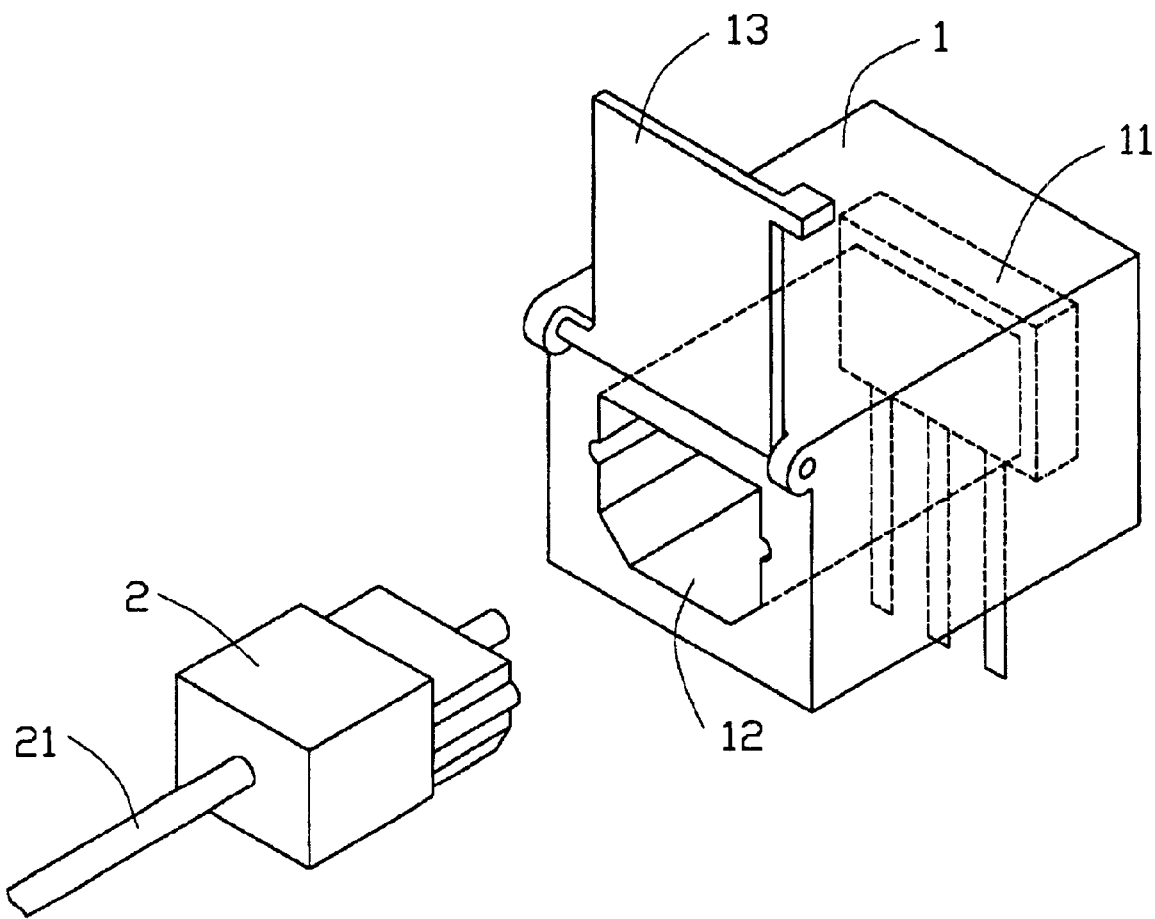
FIG. 10 shows a prior art optical connector.

FIGS. 8 and 9 show another embodiment of an optical fiber connector in accordance with the present invention. An optical fiber connector 3' comprises an insert body 31', a door 33', a housing 35', a spring member 333', an optical element 37' and a spacer 39'. The insert body 31', the housing 35', the optical element 37' and the spacer 39' are all similar to corresponding elements in the first embodiment. The door 33' is mounted in the optical fiber connector 3' by being engaged between the insert body 31' and the housing 35'. The spring member 333' is mounted in a recess 352' of the housing 35'. The door 33' is similar to the door 33 without the spring member 333. The optical element 37' is mounted between the spacer 39' and the housing 35'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector for receiving a fiber plug, comprising:
   a housing defining an inserting hole;
   an insert body mounted in the inserting hole of the housing;
   a door comprising a fixing portion being clamped between the housing and the insert body and a flexible shutter covering an inlet side of the inserting hole;
   a spring member mounted within the housing;
   wherein the shutter is bent inwardly into the inserting hole of the housing, by insertion of a fiber plug, against a spring force applied by the spring member to the door to press and stably mount the fiber plug in the inserting hole of the housing.

2. The optical fiber connector as claimed in claim 1, wherein the spring member is insert molded with the door.

3. The optical fiber connector as claimed in claim 1 wherein the insert body defines an opening closed by the shutter.

4. The optical fiber connector as claimed in claim 3, wherein the insert body comprises a faceplate, a top wall and two opposite side walls having two keys for coupling with two notches of the housing, the opening being defined in the middle of the faceplate.

5. The optical fiber connector as claimed in claim 4, wherein the housing comprises a front flange, and the fixing portion of the door is held between the front flange and the faceplate.

6. The optical fiber connector as claimed in claim 5, wherein the shutter is bent inwardly substantially perpendicular to the fixing portion after the fiber plug is inserted into the inserting hole of the housing.

7. The optical fiber connector as claimed in claim 1, wherein the spring member is mounted in a recess of the housing.

8. The optical fiber connector as claimed in claim 7, wherein the door comprises a shutter and a fixing portion, the shutter covering the inlet side of the inserting hole of the housing.

9. The optical fiber connector as claimed in claim 8, wherein the insert body defines an opening closed by the shutter.

10. The optical fiber connector as claimed in claim 9, wherein the insert body comprises a faceplate, a top wall and two opposite side walls having two keys for coupling with two notches of the housing, the opening being defined in the middle of the faceplate.

11. The optical fiber connector as claimed in claim 10, wherein the housing comprises a front flange, and the fixing portion of the door is held between the front flange and the faceplate.

12. The optical fiber connector as claimed in claim 1, further comprising an optical element and a spacer, the optical element being mounted in the housing by engaging the spacer to the housing.

13. The optical fiber connector as claimed in claim 1, wherein the door undergoes deformation when an external force is applied thereto, and restores to its original state when the external force is removed.

14. An optical fiber connector assembly comprising
   a housing defining an insertion hole defining a front opening;
   a plug adapted to be inserted into the insertion bole through said front opening; and a door having an end fixed to the housing around said front opening and covering said front opening when no plug is inserted into the insertion hole: wherein said door is configured to be able to be inwardly bent about the end thereof rather than be pivoted about said end when said plug is inserted into the insertion hole under a condition that a spring device is provided in the insertion hole and positioned between the door and a wall of the housing, and wherein the spring device is in a relaxed state until the door is moved to its halfway toward said wall and wherein the door is positioned between the plug and said wall.

15. The assembly as claimed in claim 14, wherein said spring device is attached to a back side of the door.

16. The assembly as claimed in claim 14, wherein said spring device is attached to the housing.

17. The assembly as claimed in claim 14, further including an insert body in the front opening to fix the door to the housing, and said insert body defines an inlet through which said plug is adapted to be inserted into the insertion hole.

* * * * *